INVENTOR
PATRICK L. DORMAN

BY Raphael Semmes

ATTORNEY

INVENTOR
PATRICK L. DORMAN

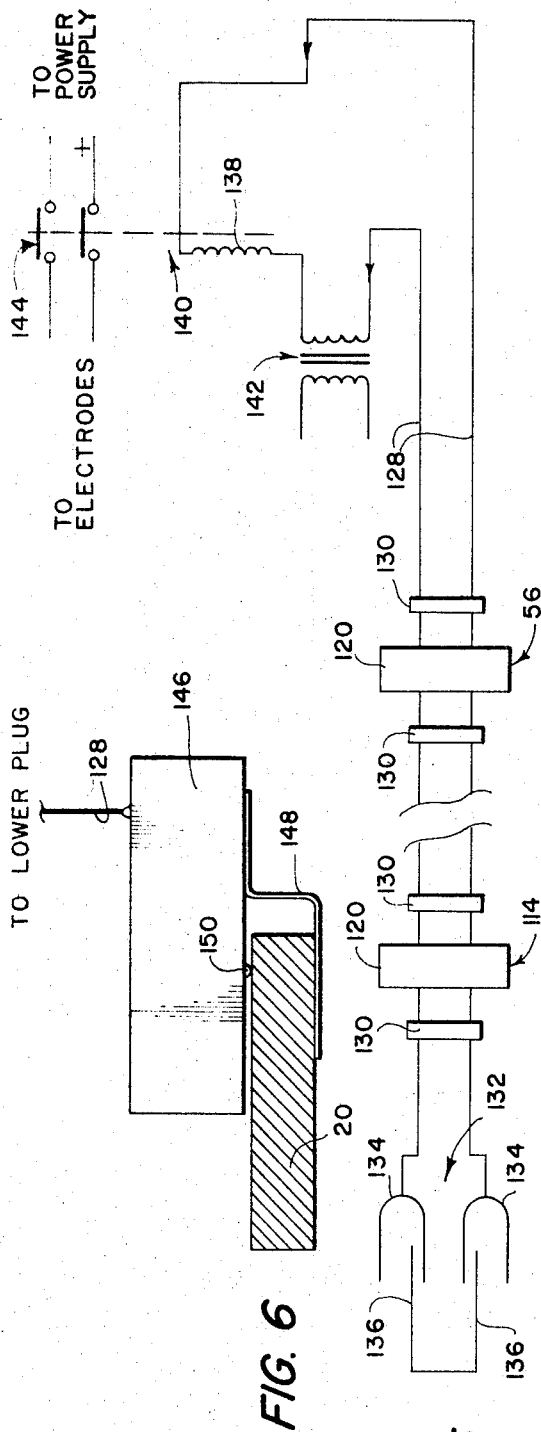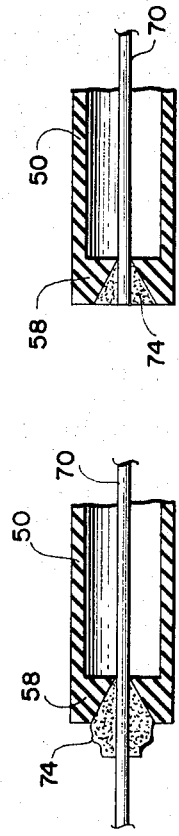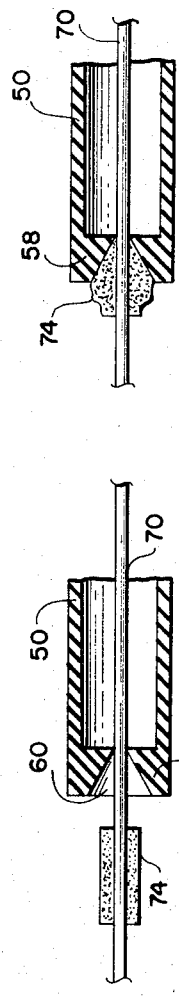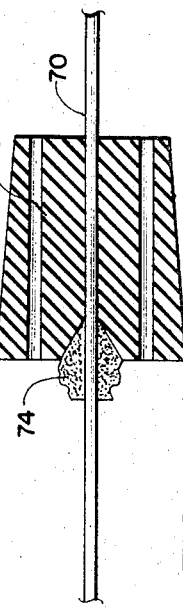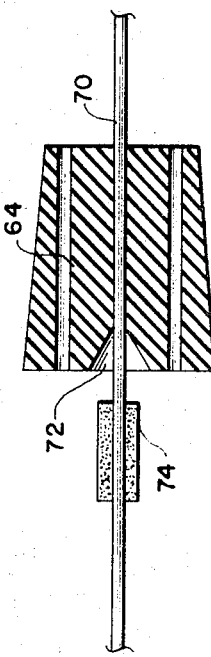

United States Patent Office 3,539,493
Patented Nov. 10, 1970

3,539,493
APPARATUS FOR PREPARATIVE ELECTRO-PHORESIS ON GEL SUPPORT MEDIA
Patrick L. Dorman, Bethesda, Md., assignor to Canal Industrial Corporation, Rockville, Md., a corporation of Maryland
Filed Aug. 31, 1967, Ser. No. 664,868
Int. Cl. B01d 15/08; B01k 5/00
U.S. Cl. 204—299   45 Claims

ABSTRACT OF THE DISCLOSURE

Apparatus for preparative electrophoresis in which a temperature-regulating jacket mounted upon a base has an upper, gel-supporting, column inserted through its top and a lower column inserted through its bottom. Different upper columns may be precisely positioned upon the jacket by ground glass shoulders. A gel surface at the bottom of the upper column is spaced from an ion-permeable disc at the top of the lower column to form a flow chamber, the height of which is adjusted by raising or lowering the lower column. Elution buffer passes from the chamber through a tube in the central core of the upper column, temperature-regulating fluid passing through the core as well as the jacket. Elution tubing connections include detachable flexible seals. Electrolyte reservoirs of the upper and lower columns have receptacles for receiving removable electrodes, which are shielded to prevent shock and which are coupled to a low-voltage interlock circuit to de-energize the electrodes when they are removed from their receptacles.

This invention relates to electrophoresis and more particularly to apparatus for preparative electrophoresis on gel support media.

The widespread success of analytical electrophoresis on various gel-like media, such as agar, starch, and polyacrylamide gels, has led to the development of equipment and techniques for the preparative separation on and elution from such gels of fractions of large-molecular-weight ionic materials, such as proteins, enzymes, hormones, nucleic acids, polypeptides, etc. Most techniques involve casting a semi-rigid gel in columnar form, loading a sample material at one end of the column, electrophoretic migration of the sample along the gel in an electrical field, separation of the sample during its migration into various sub-component fractions, and movement of the fractions from the far end of the gel into a buffer which is collected either by steady or interrupted flow or batch-wise in sequential aliquots.

Prior apparatus for preparative electrophoresis on gels fails to satisfy one or more of the following criteria, all of which should be met for successful performance:

(1) The gel column should be mechanically stable, that is, it should not swell or sag out of the tube which contains it nor shrink away from the containing walls.

(2) The gel column should be made up of chemical components which do not in themselves cause artifacts.

(3) The flow chamber in which the gel column terminates should be constructed so that the flow of elution buffer is free of eddy currents and is as thin as possible, in order to have a maximum scouring effect upon the gel surface, and so that the floor of the flow chamber is rigid, in order to avoid pooling of eluted material in unswept pockets.

(4) The gel column should be temperature regulated so that the temperature gradient across it varies by no more than 1° C. under the usual operating conditions.

(5) The gel column should be capable of being set up, and used over a wide temperature range from freezing to well above ambient.

(6) The containing tube in which the gel column is cast should be readily removable from the general apparatus in order to permit a number of preparatory, intermediate, and post-operation activities as desired (such as casting of gels, sample loading, pre-staining, intermediate staining and de-staining, removal of sample-containing sections of the gel, start of a second operation with an externally-prepared second column, etc.).

(7) The gel column should be visible from the outside of the apparatus during an electrophoretic run, for continual observation by the user.

(8) The flow chamber should be visible from the outside of the apparatus during an electrophoretic run, so that the user may observe the washing-off of visible materials, check the flow rate, and assure proper adjustment of the height of the flow chamber for optimal laminar flow conditions.

(9) The apparatus should permit the use of a very wide range of gel column volumes under conditions optimum for each.

(10) Joints for all tubing sections at locations where cross-contamination of coolant, sample, and/or elution buffer might occur, or where external leakage is possible, should be readily attachable and detachable to facilitate assembly and disassembly of the apparatus, and should be leak-proof when attached.

(11) The apparatus should be capable of disassembly for cleaning and re-assembly for use.

(12) To protect the operator against exposure to possibly lethal electrical shock, the apparatus should provide a safety interlock system, so that no electrical potential is available until the apparatus is entirely assembled and all access to electrodes and electrolytes is sealed off from possible contact by operating personnel.

Accordingly, it is a principal object of the present invention to provide improved apparatus for preparative electrophoresis on gel media, or the like, which excels as to each of the stated criteria.

More specifically, it is an object of the invention to provide apparatus of the foregoing type having a visible adjustable-width flow chamber with a rigid floor, which readily permits the interchange of gel-containing tubes of different diameters, which employs quick-disconnect leak-proof tube connections, which is dimensioned for maximum mechanical stability of the gel, and which incorporates a safety interlock circuit for the protection of the user.

Briefly stated, one embodiment of the apparatus of the present invention comprises a three-component Pyrex glass column, a base with an adjustable pedestal, a dual electrode assembly with safety interlock, and a power supply containing a low-voltage safety relay circuit activated by the interlock, so that the apparatus can only be energized when the electrodes are in place. The three-component glass column includes a gel-containing upper column, a temperature-regulating jacket, and a lower column. The jacket is mounted upon the base. The upper column extends downwardly into the jacket and the lower column extends upwardly into the jacket and is supported upon the pedestal, so that the top of the lower column, provided with an ion-permeable glass disc, may be adjusted relative to the bottom of the upper column, at which the gel is exposed, to adjust the height of the elution buffer flow chamber.

The foregoing and other objects, advantages, and features of the invention will become more readily apparent upon consideration of the following detailed description of the invention taken in conjunction with the accompanying drawings, which illustrate a preferred and exemplary embodiment and wherein:

FIG. 5 is a schematic diagram of an interlock circuit in accordance with the invention;

FIG. 6 is a partly sectional elevation view of a modified interlock of the invention; and FIGS. 7–11 are sectional views illustrating the formation of detachable leak-proof joints in accordance with the invention.

Figure 1:
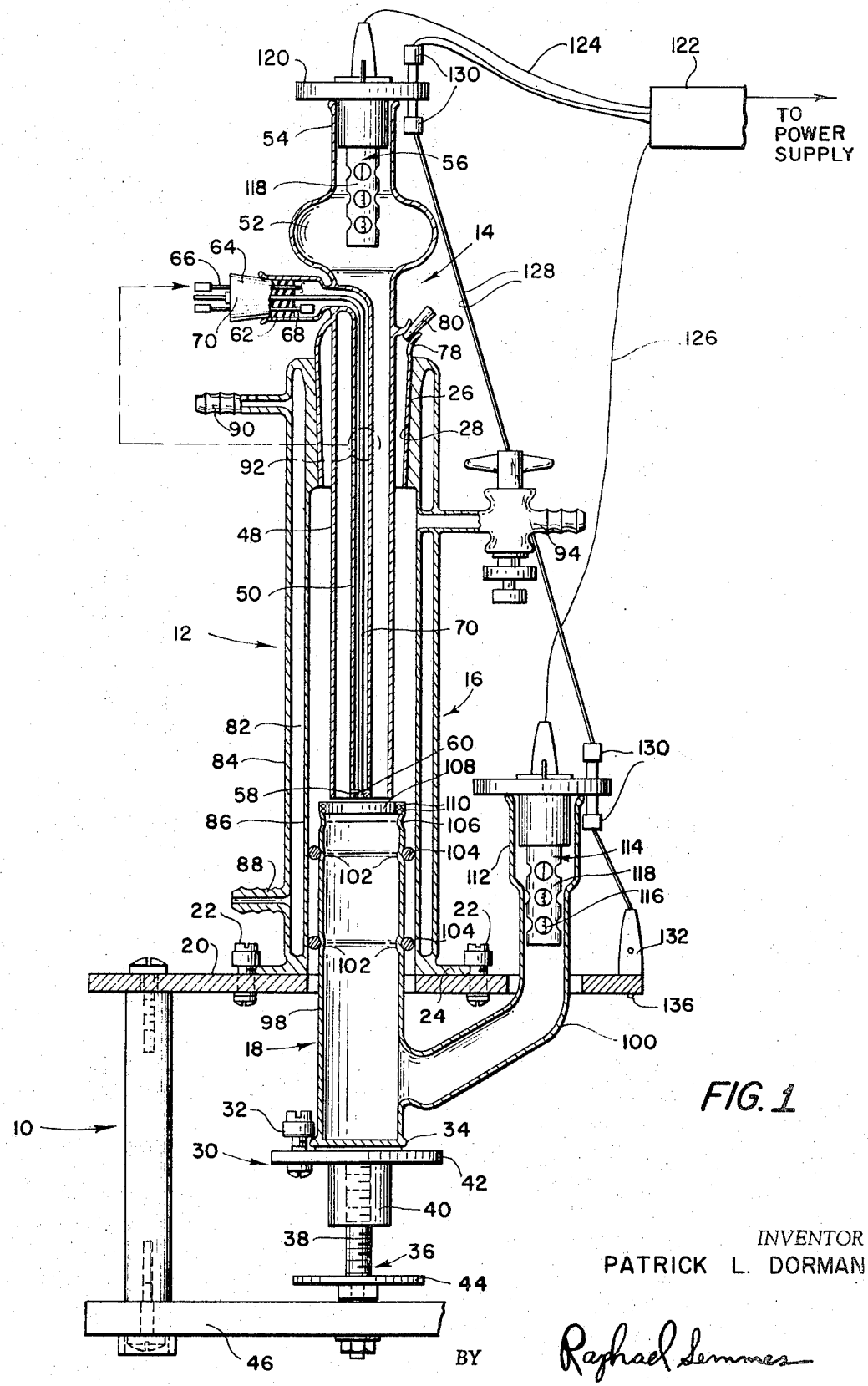
FIG. 1 is a vertical sectional view of apparatus in accordance with the invention.

Referring to the drawings, and initially to FIG. 1, the apparatus of the invention comprises a base 10 upon which a column assembly 12 is mounted. The column assembly comprises three, preferably clear Pyrex glass, components, namely, an upper column 14, an intermediate column or temperature-regulating jacket 16 and a lower column 18. The jacket 16 is rigidly mounted upon the top plate 20 of the base 10 by four nylon screws 22 (two being shown) which engage a flange 24 at the lower end of the jacket. The upper column 14 is mounted upon the jacket by inserting it down through the top of the jacket until its precision ground tapered male shoulder 26 comes to rest on the matching female shoulder 28 of the jacket. The precision ground shoulder-match provides automatic alignment of these two column sections.

The lower column 18 is mounted on a pedestal 30 of the base and is affixed thereto by three nylon screws 32 (only one being shown) which engage a bead 34 at the bottom of the lower column. The pedestal is adjustable in height by means of a screw jack 36 including a threaded male shaft 38, turning inside a threaded female collar 40 fixed to the pedestal platform 42. The shaft 38 is turned by means of a manually operated control wheel 44 fixed to it, the lower end of the shaft being rotatably supported upon the lower plate 46 of the base 10.

The upper column 14 comprises an outer cylinder or tube 48 containing a cylindrical central core or inner tube 50 defining therebetween an annular cross-section passage for receiving gel media. The top portion of the upper column 14 includes a radially enlarged electrolyte reservoir 52 having a receptacle 54 for receiving an electrode 56. The central core 50 is partially closed at the bottom by a glass plug 58 containing a tapered hole 60 with its larger diameter at the outside of the plug. The top portion of the central core extends radially through the outer wall 48 of the upper column and terminates in an enlarged manifold orifice or port 62. A tapered rubber manifold 64 fits within the orifice 62.

Figure 3:
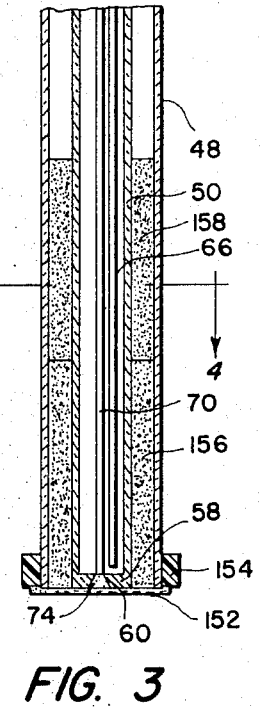
FIG. 3 is a fragmentary vertical sectional view illustrating other details.
Figure 4:
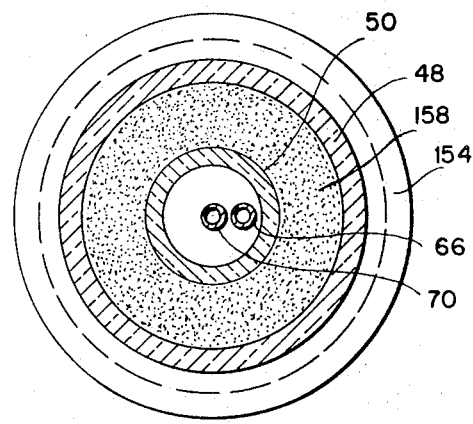
FIG. 4 is a horizontal sectional view taken along line 4—4 of FIG. 3.

Three pieces of flexible tubing (e.g., polyethylene) pass through the manifold. The first, 66, extends nearly to the bottom of the central core 50 (as shown in FIG. 3). This is the input tube for cooling or heating liquid to regulate the internal temperature of the column. The second, 68, is a short piece of tubing which removes the temperature-regulating liquid after it has traveled the length of the central core. The third, 70, is a length of capillary elution tubing which extends to the bottom of the central core and through the opening 60.

The manifold 64 has a tapered hole 72 (see FIG. 10) through which tubing 70 passes. The larger end of hole 72 is toward the outside. A detachable leak-proof joint is provided by means of a sealing sleeve 74, which may be constituted by a short length (e.g., ½") of flexible polyethylene tubing, fitted snugly over tubing 70. Sleeve 74, which has an outer diameter greater than the smallest diameter of hole 72 but less than the largest diameter, is slipped toward and jammed tightly into the tapered hole 72, providing a detachable leak-tight seal, as shown in FIG. 11. At the lower end of the tubing 70 a similar leak-tight seal is provided by jamming a short length of polyethylene tubing 74 into the tapered hole 60, as shown in FIGS. 7 and 8. To provide a flat surface at the base of the central core, the concentric tubings 70 and 74 at the lower end of the core are cut off flush with the bottom of plug 58 as shown in FIG. 9. At the upper end of the core the tubing is not so cut, and the capillary tubing 70 may be extended outwardly from the manifold for as long a distance as desired. In this leak-proof seal, the outside tube 74 actually pinches the inside tube 70 slightly at the inner end of tube 74 in the tapered hole 60.

Figure 2:
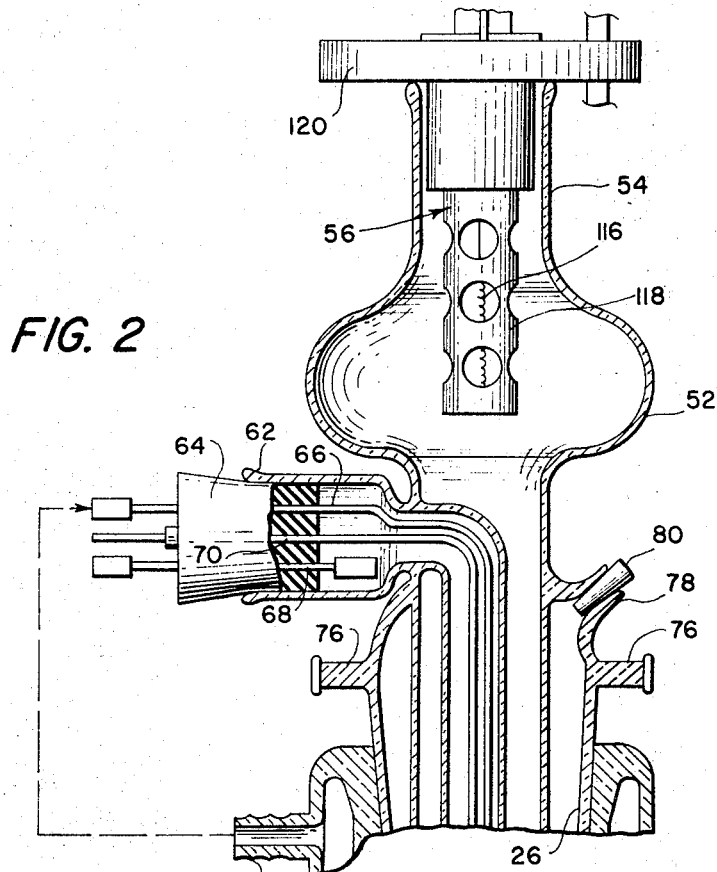
FIG. 2 is a fragmentary vertical sectional view illustrating details of the apparatus.

As shown in FIG. 2, which illustrates a slightly modified configuration, the upper column may have a pair of spring-anchor studs 76 which mount tie-down springs when the column and the jacket are assembled. Also, a vent port 78 in the upper column communicates with the interior of the jacket and permits the passage or trapping of air inside the jacket by means of a rubber stopper 80 for this purpose.

Jacket 16 is a doule walled cylinder, annular in cross section. The annular compartment 82 formed between the outer wall 84 and the inner wall 86 is closed at top and bottom. A port 88 at the bottom permits the input of temperature-regulating fluid, and a port 90 at the top permits the removal of the fluid after it has traveled the length of the annular compartment. A third port, 92, located slightly below port 90 and offset peripherally from it around the jacket, accepts a connecting line that transfers part of the fluid from the jacket to the cooling input tubing 66 in the upper column. (The position of port 92 in FIG. 2 has been modified for clarity of illustration.)

Through one side of the annular jacket is a buffer inlet port and valve 94 which introduces elution buffer into the hollow interior of the jacket. When an upper column is mounted in the jacket, the center of this hollow interior is occupied by the gel-filled upper column, so that the volume available to the inflowing buffer is an annulus bounded on the inside by the outer wall 48 of the upper column and on the outside by the inner wall 86 of the jacket.

The lower column 18 comprises a cylinder or main body 98 closed at the bottom and having a vertical side arm 100. In the upper part of the cylinder 98 two grooves 102 are formed into which fit O-rings 104 to permit reciprocative (telescoping) movement within the jacket 16 while maintaining a leak-tight seal. The top of cylinder 98 has an internal shoulder 106 which acts as a seat for an ion-permeable glass disc or wall 108. This disc, made of glass available from Owens-Corning Glass Co., has a multiplicity of pores approximately 40 Angstrom units in diameter but is impervious to large molecular materials such as protein. The disc is held in place by two small O-rings 110 which provide a leak-tight seal between the disc and the cylinder 98 of the lower column. The space between disc 108 and the bottom of the upper column, at which the gel is exposed, constitutes a thin flow chamber or slit for the elution buffer. The main body 98 and the side arm 100 of the lower column provide a reservoir for an electrolyte, and the side arm has a receptacle 112 for an electrode 114.

Each electrode, 56 and 114, comprises a platinum wire coil 116 (see FIG. 2) mounted inside a protective perforated plastic sleeve 118, which is in turn mounted on a color-coded electrode cap 120 (black for grounded, red for ungrounded) that fits the receptacle in which the electrode is inserted. The opposite polarity electrodes are preferably similarly constructed so that they may be interchanged to permit the use of the system with cathodic moving materials.

The two electrodes are connected to an electrode cable assembly 122 which carries four conductors, the two electrode leads 124 and 126 and two safety interlock leads 128. The safety interlock leads are part of a low voltage (e.g., 6 volt) safety circuit and are fixed to the electrode caps 120 by means of clamps 130. Leads 128 extend from the cap of electrode 56 to the cap of electrode 114 and then to an interlock plug 132 forming part of a connector assembly, the mating part 136 of which is supported upon the top plate 20 of the base.

Because the lengths of leads 128 between the electrodes and between the lower electrode and interlock plug 132 are chosen to make leads 128 rather taut when the electrodes and plug 132 are in place as shown in FIG. 1, it is not possible to remove either electrode from its receptacle without also removing plug 132 from its mating part 136 upon the base. Removal of electrode 114 withdraws plug 132 directly, while removal of electrode 56 withdraws electrode 114 and thereby plug 132.

A suitable interlock circuit is shown in FIG. 5. Leads 128 terminate in contacts 134 of the interlock plug 132 and are bridged by continuous contacts 136 supported upon the base. When plug 132 is withdrawn from the base, the energization circuit for the coil 138 of a safety interlock relay 140 is broken, the coil normally being energized through the low voltage secondary winding of a transformer 142, the primary winding of which may be connected to the AC supply mains. When coil 138 is de-energized, the contacts 144 of the relay open, thereby de-energizing the electrodes 56 and 114, which are connected to a DC power supply through the relay contacts.

Alternatively, a microswitch 146 (FIG. 6) may be employed in place of plug 132 and the associated connector parts. The microswitch has a spring clip 148 for detachably supporting the switch upon the top plate 20 of the base. When either electrode is removed, as set forth above, the microswitch will be withdrawn from the base, separating its actuating member 150 from platform 20 and permitting the microswitch to open the electrode circuit.

In the use and operation of the apparatus of the invention, the lower column 18 with the slit disc 108 installed is filled with electrolyte through the side arm 100 and is mounted on the pedestal 30. The jacket 16 is slipped over the lower column and anchored to the base plate by means of the screws 22. The bottom of the upper column is closed with flexible plastic film, and a suitable gel solution is poured into the desired depth. Any suitable gel solidified by any means from a starting liquid, or which consists of a matrix of individual particles, such as a slurry of ground up gel or prefabricated gel beads, flakes, or other shapes, may be employed. After the gel has solidified in one or more layers of the same or different consistency or chemical composition, sample material is layered thereon, and the remainder of the upper column (excluding the central core) is filled with electrolyte. The plastic film is then removed from the bottom of the upper column. As shown in FIG. 3, if a gel of very loose composition is employed, physical support may be provided, when desired, by affixing a nylon or similar mesh 152 across the bottom of the upper column, as by the use of a ring 154 which slips onto the column bottom. FIG. 3 also illustrates the hardened gel 156 and the sample material 158. The upper column is then placed into the jacket 16. The coolant connecting line from port 92 to tubing 66 is then installed. The column-filling process may be carried out under controlled temperature conditions, with the upper column mounted in the jacket in advance and cooling or heating liquid in circulation.

Elution buffer is introduced through buffer inlet valve 94, filling the space between walls 48 and 50 to the required height. Air vent 78 is then stoppered. Temperature regulating liquid, such as water, is introduced through port 88, flowing through the jacket 16 and, by means of the connection between port 92 and tube 66, through the central core, and exiting through port 90 and tube 68. The electrodes are then inserted in their receptacles, connected to the power supply, and the power supply turned on. When the safety interlock is connected, current flows to the electrodes.

Sample material migrates into the gel, separates into fractions, and advances toward the flow chamber at the bottom of the upper column. As fractions migrate off the exposed lower end of the gel, they are swept radially toward the center of the upper column by the buffer liquid and up the central elution tube. The fractions are prevented from moving further along the direction of ion flow by the slit disc and are prevented from collecting in pools on the slit disc by the high laminar flow in the extremely narrow (fraction of a millimeter in height) flow chamber. The laminar flow is made possible by the combination of a rigid floor and externally adjustable floor position.

The apparatus of the invention, when used with suitable gel components, satisfies all of the aforementioned requirements of a desirable apparatus. It permits a mechanically stable gel column by providing a ratio of supported-to-unsupported gel surface which minimizes gel sag across its bottom surface, even with the weakly cross-liked gels, containing as little as 3% acrylamide, which are used for certain very-high-molecular weight sample materials. This ratio is assured by limiting the maximum radius of unsupported gel surface area (between tubes 48 and 50) to a quarter of an inch. Gel columns which exceed this unsupported dimensional limit are subject to excessive sag when low-concentration gels are used. The apparatus also provides space for and permits the ready use of a support mesh across the bottom of the column to prevent in-operation swelling and sagging of even looser gels, such as those which contain less than 3% acrylamide, and to provide extra support for slippery gels which contain soap or detergents. Optional etching of the glass upper column provides further binding surface for such slippery gels.

The radial design of the flow chamber, which requires the elution buffer to wash across the bottom of the gel surface from its periphery to its center, where the outlet capillary is located, avoids the eddy-currents which are commonly found in cross-flow chambers. The adjustable pedestal mechanism, combined with the firm flat floor of the slit disc, makes it possible to decrease the height of this flow chamber (that is, the distance from the top of the slit disc to the bottom of the gel) to a fraction of a millimeter, in order to maximize the laminar flow or scouring action of the wash buffer flowing across the gel surface.

The one-quarter inch maximum radial thickness of the annular gel column, with cooling both at the inside and outside surfaces thereof, limits thermal gradients across the gel to less than 1° C. under the most extreme current loads tolerable by even the least labile sample materials that may be processed in the apparatus of the invention. The internal-external temperature-control system incorporated in the temperature-regulating jacket and central core of the upper column provides a means to set up, polymerize, or use the system at any temperature from super-cooling below zero degrees C. to just short of boiling.

The upper column, in which the gel is cast and the sample is loaded, is readily removable for any purpose and readily replaceable by another column of the same or different capacity, all columns having the same ground precision-fit supporting shoulder to ensure proper positioning relative to the lower column. By the use of three freely interchangeable upper columns of different diameters which incorporate gels with surface areas varying over a range of 1:4.6, each of which can be loaded with gels varying in height from 1 to 15 centimeters, a gel capacity of 1:690 is provided, this being adequate for handling sample loads varying over a range of approximately 1:2000, or from approximately 500 micrograms up to one gram of appropriate sample material.

The gel column is visible from the outside of the assembled apparatus during an electrophoretic run and the flow chamber, or slit, is both visible during an electrophoretic run and externally adjustable during a run.

All tubing joints are readily made and unmade by the use of the slip-sleeve construction of the invention and provide leak-proof connections. The entire column apparatus, comprising the upper and lower columns and the water jacket, plus the base, can be readily disassembled or reassembled in about one minute. The safety interlock prevents the application of power until the entire system is sealed and isolated from operator contact.

While a preferred embodiment of the invention has been shown and described, it will be apparent to those skilled in the art that changes can be made in this embodiment without departing from the principles and spirit of the invention, the scope of which is defined in the appended claims. For example, while the terms "upper . . . lower . . . top . . . bottom . . . " are employed herein for ease in relating the parts, such terms are not intended to exclude apparatus, which, within the broad concepts of the invention, might be differently oriented or associated. Accordingly, the foregoing embodiment is to be considered illustrative, rather than restrictive of the invention, and those modifications which come within the meaning and range of equivalents of the claims are to be included therein.

The invention claimed is:

1. Apparatus for preparative electrophoresis with gel media, comprising a base, a temperature-regulating jacket mounted upon said base, an upper column extending downwardly into said jacket and having a gel-supporting passage providing a gel surface at the lower end and an electrolyte reservoir above said passage, and a lower column extending upwardly into said jacket with its upper end in proximity to the lower end of the upper column to define a space therebetween, said lower column having a layer of ion-permeable material across its said upper end and having an electrolyte reservoir therein below said layer, electrode means coupled to said reservoirs, respectively, means for supplying an elution buffer to said space, means for removing said elution buffer after it passes into said space, and means for adjusting the position of said layer relative to the lower end of said upper column to vary the height of said space, said adjusting means comprising means for mounting said lower column on said base independently of said upper column and providing adjustment of the position of said lower column on said base while permitting the electrode means of the lower column to remain coupled to the reservoir in said lower column.

2. The apparatus of claim 1, said layer of ion-permeable material comprising a rigid disc of porous glass.

3. The apparatus of claim 2, said disc having a plurality of pores approximately forty angstrom units in diameter.

4. The apparatus of claim 2, said lower column having an internal shoulder at its upper end supporting said disc, and said disc being sealed into said lower column by at least one O-ring.

5. The apparatus of claim 1, said means for adjusting the position of said layer comprising means for mounting said lower column upon said base for reciprocative movement toward and away from said upper column.

6. The apparatus of claim 5, said lower column having sealing means between it and said jacket for permitting relative telescoping movement while maintaining a seal.

7. The apparatus of claim 1, said reservoir of said lower column comprising a hollow side arm with the associated electrode means therein.

8. Apparatus for preparative electrophoresis with gel media, comprising a base, a temperature-regulating jacket mounted upon said base, an upper column extending downwardly into said jacket and having a gel-supporting passage providing a gel surface at the lower end and an electrolyte reservoir above said passage, and a lower column extending upwardly into said jacket with its upper end in proximity to the lower end of the upper column to define a space therebetween, said lower column having a layer of ion-permeable material across its said upper end and having an electrolyte reservoir therein below said layer, electrode means coupled to said reservoirs, respectively, means for supplying an elution buffer to said space, means for removing said elution buffer after it passes into said space, and means for adjusting the position of said layer relative to the lower end of said upper column to vary the height of said space, said reservoirs having receptacles for receiving said electrode means therein, respectively, electric supply means connected to said electrode means respectively, and means for de-energizing said electric supply means when either of said electrode means is removed from its associated receptacle.

9. The apparatus of claim 8, said electrode means each having a plug readily removed from its asociated receptacle.

10. The apparatus of claim 8, said receptacles and said electrode means being similarly constructed to permit said electrode means to be inserted into said receptacles interchangeably.

11. The apparatus of claim 8, said de-energizing means comprising an interlock circuit responsive to the position of said electrode means.

12. The apparatus of claim 11, said interlock circuit comprising a low voltage relay circuit having control means responsive to the position of said electrode means.

13. The apparatus of claim 12, said control means being coupled to said electrode means by means for actuating said control means when either of said electrode means is removed from its receptacle.

14. The apparatus of claim 12, said control means comprising a connector having a portion movable with said electrode means and a portion fixed to said base.

15. The apparatus of claim 12, said control means comprising a microswitch supported upon said base for removal therefrom when either of said electrode means is removed from its receptacle and having actuating means responsive to its position relative to said base.

16. The apparatus of claim 12, said control means being coupled to said electrode means by cable means for actuating said control means when either of said electrode means is removed from its receptacle.

17. The apparatus of claim 8, each of said electrode means comprising a coil of platinum wire completely surrounded by a perforated plastic sleeve to prevent the wire from being touched when the electrode means are removed from their receptacles.

18. Apparatus for preparative electrophoresis with gel media, comprising a base, a temperature-regulating jacket mounted upon said base, an upper column extending downwardly into said jacket and having a gel-supporting passage providing a gel surface at the lower end and an electrolyte reservoir above said passage, and a lower column extending upwardly into said jacket with its upper end in proximity to the lower end of the upper column to define a space therebetween, said lower column having a layer of ion-permeable material across its said upper end and having an electrolyte reservoir therein below said layer, electrode means coupled to said reservoirs, respectively, means for supplying an elution buffer to said space, means for removing said elution buffer after it passes into said space, and means for adjusting the position of said layer relative to the lower end of said upper column to vary the height of said space, said adjusting means comprising a pedestal platform adjustably mounted upon said base, said lower column being supported upon said platform for movement therewith.

19. The apparatus of claim 18, said platform being mounted upon said base by means of a screw jack.

20. Apparatus for preparative electrophoresis with gel media, comprising a base, a temperature-regulating jacket mounted upon said base, an upper column extending downwardly into said jacket and having a gel-supporting passage providing a gel surface at the lower end and an electrolyte reservoir above said passage, and a lower column extending upwardly into said jacket with its upper end in proximity to the lower end of the upper column to define a space therebetween, said lower column having a layer of ion-permeable material across its said upper end and having an electrolyte reservoir therein below said layer, electrode means coupled to said reservoirs, respectively, means for supplying an elution buffer to said space, means for removing said elution buffer after it passes into said space, and means for adjusting the position of said layer relative to the lower end of said upper column to vary the height of said space, said upper column being separably supported on said jacket and comprising an outer tube and an inner tube integral therewith between which said gel-supporting passage is formed, said inner tube having a wall at the lower end thereof with an opening therethrough, said means for removing said elution buffer comprising a capillary tube located within said inner tube and having one end connected to said opening and its other end extending from said inner tube through a manifold.

21. The apparatus of claim 20, said capillary tube being flexible and connected to said opening by a detachable leak-tight joint.

22. The apparatus of claim 21, said wall being a glass plug and said opening being tapered inwardly, said flexible tube extending into said opening, said joint comprising a sealing sleeve of flexible tubing fitted snugly over the capillary tube, having an outer diameter greater than the smallest diameter of said opening but less than the largest inner diameter of said opening, said sealing sleeve being compressed into said opening, and said sealing sleeve and said capillary tube terminating substantially flush with the exterior of said plug.

23. The apparatus of claim 20, said manifold comprising a plug having an inwardly tapered hole through which said capillary tube passes, and a sealing sleeve fitted snugly over said capillary tube, having an outer diameter greater than the smallest diameter of said hole but less than the largest diameter of said hole and compressed into said hole.

24. The apparatus of claim 20, the maximum radial dimension of said passage being no greater than substantially one quarter of an inch.

25. The apparatus of claim 20, said inner tube extending substantially parallel to said outer tube for a substantial distance from its lower end and then extending transversely through said outer tube.

26. The apparatus of claim 20, the reservoir of said upper column comprising a radially enlarged section above said inner tube.

27. The apparatus of claim 20, the upper end of said inner tube terminating in an orifice for receiving said manifold therein.

28. The apparatus of claim 27, said manifold having three ports therethrough, one of which is connected to said opening at the lower end of said inner tube by said capillary tubing, a second of which is connected to a tube extending through said inner tube into proximity with the lower end thereof, and the third of which is connected to a relatively short tube terminating close to the manifold.

29. Apparatus for preparative electrophoresis with gel media, comprising a base, a temperature-regulating jacket mounted upon said base, an upper column extending downwardly into said jacket and having a gel-supporting passage providing a gel surface at the lower end and an electrolyte reservoir above said passage, and a lower column extending upwardly into said jacket with its upper end in proximity to the lower end of the upper column to define a space therebetween, said lower column having a layer of ion-permeable material across its said upper end and having an electrolyte reservoir therein below said layer, electrode means coupled to said reservoirs, respectively, means for supplying an elution buffer to said space, means for removing said elution buffer after it passes into said space, and means for adjusting the position of said layer relative to the lower end of said upper column to vary the height of said space, said upper column being removably supported upon said jacket by means of matching tapered shoulders of said upper column and said jacket, respectively.

30. In apparatus for preparative electrophoresis on gel media, a base, a gel-supporting column mounted on said base and providing a gel surface at one end thereof, a further column mounted on said base independently of the gel-supporting column and having at one end thereof a layer of ion-permeable material spaced from said surface in proximity therewith to define an elution buffer flow space therebetween, a wall mounted on said base surrounding said space, means for adjusting the distance between said layer and said surface to vary the width of said space, and electrode means coupled to said columns, respectively, said adjusting means comprising means for telescoping said further column within said wall and including a platform reciprocatively supporting said further column in said base.

31. In the apparatus of claim 30, said layer comprising a porous rigid disc.

32. In the apparatus of claim 31, said disc being glass with pores of the order of 40 angstrom units cross-dimension.

33. In the apparatus of claim 30, said wall being transparent.

34. In the apparatus of claim 30, said platform being supported on said base by a screw jack.

35. In the apparatus of claim 30, said wall comprising a temperature-regulating jacket, said gel-supporting column being mounted on said jacket by matching shoulders.

36. In the apparatus of claim 30, said gel-supporting column having a bottom wall with an elution buffer exit opening therethrough, said gel surface surrounding said bottom wall.

37. In apparatus for preparative electrophoresis on gel media, a one-piece column comprising an outer tube and an inner tube defining therebetween a gel-holding passage, said inner tube extending parallel to said outer tube over a substantial portion of its length and then extending transversely through the outer tube and terminating in a manifold orifice, a capillary feed tube extending from said manifold orifice to the bottom of said inner tube, said outer tube having an electrolyte reservoir adjacent to one end thereof with a receptacle, and electrode means coupled to said receptacle.

38. In the apparatus of claim 37, said reservoir being located above said orifice and being transversely enlarged.

39. In the apparatus of claim 27, said outer tube being surrounded by a tapered male mounting shoulder.

40. In the apparatus of claim 39, said shoulder having a port extending therethrough.

41. In the apparatus of claim 27, said inner tube being substantially coterminous with said outer tube at the end opposite to said manifold orifice.

42. In the apparatus of claim 41, said inner tube having a wall closing its last-mentioned end with a hole therethrough for elution buffer.

43. In the apparatus of claim 42, said capillary tube extending from said hole.

44. In the apparatus of claim 43, said capillary tube being connected to said hole by a detachable leak-tight joint.

45. In the apparatus of claim 43, said orifice having a manifold therein with a tube extending therethrough and through said inner tube almost to the said end of said inner tube and with an additional tube therethrough terminating relatively close to said manifold.

References Cited

UNITED STATES PATENTS

| 3,326,790 | 6/1967 | Bergrahm | 204—180 |
| 3,346,479 | 10/1967 | Natelson | 204—301 |
| 3,375,187 | 3/1968 | Buchler | 204—301 |

OTHER REFERENCES

Heftman: "Chromatography," 2nd ed., QD 271 H4 C. 3, 1967, pp. 348, 349, 452 and 453.

Corning Glass Works, "Pyrex Labware" Catalog, 1967, TP 868 C 78, pp. 310 and 318.

JOHN H. MACK, Primary Examiner

A. C. PRESCOTT, Assistant Examiner

U.S. Cl. X.R.

204—180